(12) United States Patent
Howes et al.

(10) Patent No.: US 11,673,659 B2
(45) Date of Patent: Jun. 13, 2023

(54) LIGHT-WEIGHT, ELASTIC TEETER BEARING FOR A ROTOR AND AIRCRAFT HOUSING SUCH BEARING

(71) Applicant: Volocopter GmbH, Bruchsal (DE)

(72) Inventors: Jonathan Sebastian Howes, Hampshire (GB); Ulrich Schäferlein, Karlsdorf (DE)

(73) Assignee: Volocopter GmbH, Bruchsal (DE)

( * ) Notice: Subject to any disclaimer, the term of this patent is extended or adjusted under 35 U.S.C. 154(b) by 23 days.

(21) Appl. No.: 17/526,069

(22) Filed: Nov. 15, 2021

(65) Prior Publication Data

US 2022/0153407 A1 May 19, 2022

(30) Foreign Application Priority Data

Nov. 13, 2020 (EP) .................................... 20207437

(51) Int. Cl.
*B64C 27/35* (2006.01)
*B64C 27/08* (2023.01)
*B64D 27/24* (2006.01)

(52) U.S. Cl.
CPC .............. *B64C 27/35* (2013.01); *B64C 27/08* (2013.01); *B64D 27/24* (2013.01)

(58) Field of Classification Search
CPC ......... B64C 27/08; B64C 27/14; B64C 27/24; B64C 27/32; B64C 27/35; B64C 27/43; B64C 27/54
USPC ...................................................... 416/134 A
See application file for complete search history.

(56) References Cited

U.S. PATENT DOCUMENTS

| | | | |
|---|---|---|---|
| 2,827,968 A | 3/1958 | Sissingh et al. | |
| 3,288,226 A | 11/1966 | Lemont, Jr. et al. | |
| 4,466,773 A * | 8/1984 | Pariani ..................... | B64C 27/82 416/134 A |
| 6,764,280 B2 * | 7/2004 | Sehgal .................... | B64C 27/48 416/134 A |
| 8,167,561 B2 * | 5/2012 | Jones ....................... | F16F 15/08 416/134 A |
| 9,657,582 B2 * | 5/2017 | Haldeman ........... | B64C 29/0033 |
| 2010/0038469 A1 | 2/2010 | Ballerio et al. | |

FOREIGN PATENT DOCUMENTS

EP 3345830 7/2018

* cited by examiner

*Primary Examiner* — Woody A Lee, Jr.
*Assistant Examiner* — Justin A Pruitt
(74) *Attorney, Agent, or Firm* — Volpe Koenig (57) ABSTRACT

A passive elastic teeter bearing for an aircraft rotor, including, rotatably arranged on an rotational axis of said rotor, a teeter beam, configured for attaching the rotor which has rotor blades, with the teeter beam being configured for performing a teetering motion, and having two pairs of first lugs arranged at opposite ends thereof at a distance with respect to the rotational axis; and a hub piece located below the teeter beam, the hub piece having two arms that extend outwardly in a radial direction, each having a second lug arranged at a distance with respect to said rotational axis. Each second lug is located between the two lugs of a respective pair of first lugs, and respective connecting pins pass through the first and second lugs on either side of the rotational axis. A pair of elastic bushings are arranged on each connecting pin between a first one of the first lugs and the second lug and between a second one of said first lugs and the second lug, respectively.

20 Claims, 8 Drawing Sheets

LIGHT-WEIGHT, ELASTIC TEETER BEARING FOR A ROTOR AND AIRCRAFT HOUSING SUCH BEARING

INCORPORATION BY REFERENCE

The following documents are incorporated herein by reference as if fully set forth: European Patent Application No. 20 207 437.3, filed Nov. 13, 2020.

TECHNICAL FIELD

The invention relates to an elastic teeter bearing for a rotor, particularly in an aircraft.

The invention further relates to a driving arrangement for driving a rotor in an aircraft.

The invention also relates to an aircraft with at least one propulsion unit comprising a rotor, in particular a multi-rotor VTOL aircraft with distributed electrically powered propulsion units, at least some of which comprise a rotor.

BACKGROUND

Many existing rotorcraft, i.e., aircraft lifted or propelled by means of propellers or rotors use teetering rotor hubs with elastomeric bearings. Existing hubs of this kind use laminated elastomeric torsion bearings which are subject to intensive wear effects which significantly limit the lifetime of such bearings. Existing teetering rotor hubs use elastomeric teeter bearings which place the elastomeric elements primarily in shear under deformation induced by teeter oscillations of the rotor blades.

Furthermore, known teetering rotor hubs are vulnerable to catastrophic outcomes from single structural or mechanical faults. Although these units are well proven in service, a single structural failure of a primary load path can result in the loss of control of, or the release of the rotor.

There is a need for a lightweight, low maintenance and simple failsafe teetering rotor hub suitable for both powered and unpowered rotors, e.g., for an aircraft or for a gyroplane. Currently, these all use two blade teeter rotors with cyclic pitch adjustment achieved by direct control of the rotor rotational axis. As used herein, an unpowered rotor is a rotor that has no applied torque to the shaft (unlike a wind turbine wherein the generator applies a reaction torque to the shaft). There is also a need for an aircraft equipped with such a lightweight, low maintenance and simple failsafe teetering rotor hub.

SUMMARY

It is the object of the invention to satisfy these needs.

According to the invention, the object is achieved by a bearing having one or more of the features described herein, by an arrangement having one or more of the features described herein—and by an aircraft having one or more of the features described herein. Advantageous further embodiments are defined below and in the claims.

According to a first aspect of the invention, an elastic teeter bearing for a rotor, particularly in an aircraft, comprises, rotatably arranged on an rotational axis of said rotor:

a teeter beam, configured for attaching thereto a rotor having at least two rotor blades, either as separate blade parts or in one piece (i.e., monolithic), said teeter beam being devised for performing a teetering motion with respect to said rotational axis and having at least two first lugs or two pairs of first lugs arranged at opposite ends thereof at a distance with respect to said rotational axis;

a hub piece located below said teeter beam, said hub piece having at least two arms that extend outwardly in a radial direction with respect to said rotational axis, each of said arms having a second lug, in case said teeter beam has said two pairs of first lugs, or having a pair of second lugs, in case said teeter beam has said two first lugs, arranged at said distance with respect to said rotational axis;

wherein each one of said second lugs is located between the two lugs of a respective pair of first lugs or wherein each one of said first lugs is located between the two lugs of a respective pair of second lugs, and respective connecting pins pass through said first and second lugs on either side of said rotational axis; and wherein a pair of elastic bushings, i.e., bushings made from an elastic material, e.g., elastomers like polyurethane, natural rubber, butyl rubber or cushions made from metal, are arranged on each of said connecting pins between a first one of said first lugs and said second lug and between a second one of said first lugs and said second lug, respectively, or vice versa (i.e., if there are pairs of second lugs and only single first lugs arranges therebetween).

Teeter bearings are known, in particular, from helicopters. Such teeter bearings generally comprise an active control of the rotor blade pitch angle. The present invention, on the other hand, may advantageously relate to a so-called "fixed pitch" configuration, wherein the teeter bearing allows some rotation of the rotor blades, this rotation being passive, i.e., uncontrolled (or not actively controlled), which may differentiate embodiments of the present invention from known (helicopter) teeter bearings.

According to a second aspect of the invention, a driving arrangement for driving a rotor in an aircraft comprises the bearing according to an embodiment of the invention, said bearing having a central pin extending along said rotational axis, through said hub piece and said teeter beam, which central pin is devised for fixing a relative position of said hub piece and said teeter beam on said rotational axis, and further comprises a motor, preferably an electric motor, said motor comprising a hollow drive shaft, which drive shaft is connected to said hub piece for rotatably driving same, wherein said central pin extends coaxially through said drive shaft, wherein preferably said screw head according to an embodiment of the inventive bearing abuts on a terminal cap (failsafe cap) of said drive shaft.

According to a third aspect of the invention, an aircraft with at least one propulsion unit comprises a rotor, in particular multi-rotor VTOL aircraft with distributed electrically powered propulsion units, at least some of which comprise a rotor, wherein said at least one rotor comprises a bearing or the driving arrangement according to the invention, wherein at least two rotor blades of said at least one rotor are attached to a teeter beam of said bearing on opposing sides thereof, wherein preferably said hub piece is connected to a drive shaft of a motor comprised in said at least one propulsion unit.

The teetering pivot of the current invention uses simple elastic bushings mounted on a pin, i.e., said connecting pin (also referred to as teeter pin). The teetering axis is normal to the pin axis and the elastic bushings are primarily loaded in compression resulting in an intrinsically long fatigue life with a very simple and low-cost elastic component.

The teeter pins may advantageously be angled relative to the rotational axis of the rotor while remaining normal to the teetering axis to align with the resultant force vector due to the driving torque applied to the rotor and the lift produced by the rotor in a selected operational condition. These features ensure that most of the load seen by the bushings is along the axis of symmetry of the bushing with only teetering producing a moment load over the face of the bushing. This further ensures that stress oscillations within the bushing due to teetering produce the minimum possible stress amplitude and hence a long fatigue life.

The invention also incorporates, in a preferred further embodiment thereof, which embodiment is potentially independent from said first aspect of the invention, a central retaining pin (or failsafe pin) that is trivially loaded in normal use but, in the case of most single failures of any other element of the hub, will both retain and constrain the rotor within positional limits relative to the hub piece that preserve its function as a rotor. Other than a primary rotor shaft failure, a complete failure of the torque-reacting elements of the hub will result in the retention and constraint of the rotor but without the continuation of power delivery to the rotor.

Prior art in this respect does not, to the knowledge of the applicant, include failsafe features, thus resulting in potential catastrophic results arising from the failure of individual hub elements. Such damage may be due to cyclic loading induced fatigue or from single impact events such as bird strike.

In a further preferred embodiment, a shaped sleeve is fitted over the central failsafe pin and, in conjunction with a bore through which it passes within the teeter beam, provides a limiting stop for teetering motion. Said sleeve may be made from a material particularly suited to resisting impact loading, e.g., nylon, fabric reinforced phenolic resin, or an elastomer such as rubber or polyurethane, etc.

The current invention uses simple elastic bushings and preferably places them under some pre-compression. In a corresponding embodiment of the bearing according to the present invention the bushings are pre-compressed by means of the connecting or teeter pins Teeter deflections then either increase or reduce the degree of compression of the bushings but do not place any part of the bushings in tension. As crack growth is primarily due to tensile loading, this compressive loading inhibits the growth of fatigue cracks within the bushings and results in the potential for a long service life with resulting low maintenance costs.

To achieve this, in another preferred embodiment the connecting pins comprise means for compressing said bushings, in particular screwing means, said screwing means comprising a screw head, a threaded end portion opposite said screw head, and a screw nut engaging said threaded end.

Furthermore, preferably each connecting pin has an outer thread at a second end that threadedly engages a screw nut. This provides an easy way to ensure almost any desirable amount of (pre-)compression.

While the bearing according to an embodiment of the invention can be devised so that the elastic bushings are pre-compressed by means of the connecting pins, the bushings can also be pre-compressed by forcing them between two lugs that are a fixed, i.e., placed at a fixed relative distance, which distance is smaller than a corresponding dimension of a respective bushing.

In another preferred embodiment of the bearing according to the invention the elastic bushings are devised in the form of truncated cones, preferably with a respective base of said cones being in contact with said hub piece. Applicant has found that this configuration provides the best effects as far as the teetering behaviour of the bearing and its wear resistance are concerned. However, there are situations where it is preferred to arrange the bushings differently, e.g., the other way around. If the narrow end or tip (apex) of said cones is against the central (or second) lug (i.e., the hub piece) then stiffness will be lower than with the base against said lug.

However, other forms can be considered for the bushings as well: There is an advantage in configuring the bushings to generate a defined non-linear characteristic with deflection. If a piece of elastic material resting on a solid surface is compressed against that surface then, as the compression is increased, the ultimate stiffness will be that of the surface against which the elastic material is compressed. If the piece of elastic material is shaped correctly, any selected load/deflection characteristic can be achieved. This is also true of the bushings in this application.

Problems of oscillatory resonance are very common in rotorcraft. With any spring-mass system, the natural (Eigen) frequency is a direct function of the force-deflection gradient of the spring element. If a non-linear spring is used, then at each deflection amplitude, the resonant frequency has a unique value. If excited by an external oscillatory force, then oscillation cannot build as any increase in amplitude results in a changed natural frequency and unless the excitation frequency changes to track this change in natural frequency, the excitation becomes ineffective. This constitutes an important feature of the concept of the use of elastic bushings in the present invention.

Therefore, the shaping of the bushings to achieve a selected non-linearity can be used in embodiments of the present invention together with the inherently non-linear elastic behaviour of such bushings when loaded in compression. Using, e.g., finite element methods, one could define a custom form for the bushings for a specific use.

Alternatively or additionally, one could also modify a shape or structure of said surface in order to achieve a desired load/deflection characteristic for the bushings.

In another embodiment of the bearing according to the invention said hub piece is rotated with respect to the teeter beam around said rotational axis. Such an arrangement is particularly well suited for powered rotors, e.g., in an aircraft.

In a highly advantageous embodiment of the bearing according to the invention said first and second lugs, i.e., the respective bores or through-holes comprised therein and accordingly also said connecting pins are angled at 15° to 50°, preferably 20 to 40°, most preferably 30 to 35°, with respect to said rotational axis. This helps to achieve the above-mentioned compressional load on the bushings, since this configuration ensures that the resultant force induced by the normal driving torque on the rotor and the induced lift passes along the axis of each connecting pin. This reduces shearing loads on the elastic bushings and so reduces the potential for progressive damage due to deformation other than compression within the bushings.

Therefore, according to a further embodiment, said connecting pins are obliquely oriented with respect to said rotational axis, wherein preferably said connecting pins are obliquely oriented relative to said rotational axis in symmetrical fashion.

Such an embodiment serves to align the bushing axis with the resultant force arising from the driving torque and the rotor lift and is dictated entirely by the relative magnitude of these two forces at the bushing axis radius from the rotor axis and a selected design operating condition. The range could therefore, in principle, comprise any angle between 0° and 90°. For an unpowered rotor (a gyroplane for example), the angle would advantageously be 0°.

Therefore, in a corresponding further embodiment of the invention said hub piece is aligned with respect to the teeter beam, in particular in the case of an unpowered rotor.

In a corresponding further embodiment of the bearing according to the invention, said teeter beam comprises a central portion arranged on said rotational axis, said central portion having a least one fixing structure for attaching said rotor, said teeter beam further comprising, departing from said central portion, two arms that extend outwardly in opposite radial directions with respect to said rotational axis, each of said arms comprising one of said pairs of first lugs arranged at said distance with respect to said rotational axis. This leads to a particularly simple and lightweight design of the bearing, which design requires a lower number of individual elements when compared with alternative designs.

In yet a further embodiment of the bearing according to the invention, a fitted tubular spacer is passed through the two elastic bushings for each pair of said first lugs and bears on each of said two first lugs. Said spacer reacts compression from the corresponding connecting pin and may be a simple way to limit the loading of the elastic bushings, if it is of inferior length when compared with a corresponding dimension of the bushings.

In yet a further embodiment of the bearing according to the invention, said first lugs and/or said second lugs comprise a recessed or a protruding portion surrounding a lug through-hole. This recessed or protruding portion can be used to surround part of the bushings for defining a positioning thereof.

In order to provide failsafe behaviour, in a further embodiment the bearing according to the invention further comprises a central pin (or failsafe pin) extending along said rotational axis, through said hub piece and said teeter beam, which central pin is devised for fixing a relative position of said hub piece and said teeter beam on said rotational axis. If lift load path integrity is compromised by a structural failure, the teeter beam may become free to move in the direction of the lift force relative to the central failsafe pin. In this event, the motion is arrested by means of said central pin and lift forces are then transmitted to a driven part of the hub directly by the failsafe pin. In this way, catastrophic failure of the bearing is prevented in a sense that a failsafe constraint prevents the rotor from developing adverse behaviour after a failure including failure of the bearing.

It should be noted that providing said central pin (or failsafe pin) can also be done separately from many of the above-noted features, in particular said elastic bushings. Said feature (i.e., the failsafe pin) and any other feature depending thereon is not limited to the specific embodiments as defined above.

In order to enable and restrict a teetering motion of the teeter beam, in a further embodiment of the bearing according to the invention said bearing further comprises an angled sleeve (shaped sleeve or teeter stop sleeve) around said central pin extending through an opening in said teeter beam, said angled sleeve preferably having the form of a (doubly) truncated cone, a maximum diameter of which is in close clearance with an inner diameter of said opening. Most preferably, said hub piece abuts on an end of said angled sleeve, most preferably on an apex thereof. In this way, the outer inclined cone surfaces permit and restrict said teetering motion. It is undesirable to have constant contact due to wear considerations. It is preferred that the flanks of the conical parts should touch the bore evenly when the maximum teeter amplitude is reached. Close clearance is desirable for fail safety as it provides radial constraint to the rotor in a failsafe situation. The clearance between this angled sleeve and the inside of the bore or opening defines the radial constraint in the event of primary load path failure. Alternatively or additionally, a teeter stop could also be provided as an abutment element below the rotor blades in order to limit a teetering motion.

Providing a double cone (or two cones) may help to spread the load over a greater surface area, thus reducing wear and increasing lifetime.

In a further embodiment, the bearing according to the invention further comprises a spacing sleeve around said central pin extending through said opening in said teeter beam inside and through said angled sleeve. An upper end of the failsafe pin advantageously clamps the teeter beam against said spacing sleeve and so reacts any lift loads from the rotor directly via the failsafe pin, thus providing enhanced safety.

In a further embodiment aimed in the same direction, the bearing according to the invention comprises a retainer piece arranged on said central pin at a first end thereof, said first end being located on a side of said teeter beam opposite from said hub piece. In this way, said upper end of the failsafe pin advantageously clamps said retainer piece against said spacing sleeve and so reacts any lift loads from the rotor via the failsafe pin, thus providing further enhanced safety.

In order to ensure this functioning, said retainer piece may be clamped, in a further embodiment of the bearing according to the invention, against said spacing sleeve and/or said angled sleeve, preferably by devising said central pin with a screw head at one end thereof and with a threaded portion that engages a screw nut at the other end thereof, said screw nut most preferably being in contact with said retainer piece.

Preferably, in a further embodiment of the bearing according to the invention said retainer piece has at least one, preferably two buffer protrusions in close clearance with said teeter beam, which in the case of two such protrusions are aligned in azimuth with a teeter axis. The retainer piece (or failsafe retainer) is preferably clamped against the spacing sleeve mentioned earlier. It performs a retaining function in a failsafe situation. Similarly, it may carry a pair of buffer protrusions in close clearance with the top of the teeter beam. These provide vertical constraint in the event of any primary load path failure of the hub or an associated driving shaft (cf. below). They are preferably aligned in azimuth with the teeter axis to preserve the correct teeter axis after primary load path failure and so to ensure consistent rotor behaviour.

In this way, said failsafe constraint may be provided (jointly) by the failsafe pin (constrains the teeter stop sleeve), the retainer piece (and the buffer features below the retainer piece, vertical constraint) and the teeter stop sleeve (radial constraint within operating limits).

A surface coating, or treatment on the mating faces of the teeter beam and said buffer projections may constitute an advantageous further embodiment as they experience some relative sliding motion. They need to last long enough in a failsafe situation to allow the aircraft to land safely. Amorphous diamond, which is extremely hard, very tough and has very low friction, can be an appropriate treatment for aluminum alloys in this situation. However, the invention is not limited in this respect.

In yet another, highly preferred embodiment of the bearing according to the invention, a teeter axis is rotated by an angle $\varphi$, $\varphi>0°$ or $\varphi<0°$, preferably in the range $-60°<\varphi<-30°$, with respect to a normal axis of the rotor, which normal axis is oriented at right angles with respect to a rotor axis.

Generally, the rotor, i.e., the individual rotor blades has (have) a leading edge and a trailing edge in relation to a sense of rotation of the rotor. The rotor also has a rotor axis, which must not be confounded with the rotational axis (of the motor). At rights angles with respect to said rotor axis lies so-called normal axis. With respect to said normal axis, the teeter axis of known (active) teeter bearings is rotated in positive direction by an angle $\varphi$, $\varphi > 0°$.

A range of skew angles were explored analytically by the applicant and the results for a negative skew angle ($\varphi < 0°$) were surprising and of great interest. Accordingly, this configuration was designed as a physical specimen and tested. Wind tunnel experiments confirmed that a negative rotation of the teeter axis, i.e., with $\varphi < 0°$, preferably $-60° < \varphi < -30°$, generates a preferred lift vector in the case of a rotor without cyclic-control, which is a preferred use case of the present invention. Alternative embodiments of the present invention therefore comprise a teeter axis that is either rotated in positive direction or (preferably) in negative direction with respect said neutral axis of the rotor.

This may generate a lift vector with a reduced backward tilt in a direction opposite the direction of flight, while keeping the rotor stable aerodynamically, which may lead to a power reduction in forward flight.

Thus, the present description further comprises a novel design of an aerodynamically stable rotor with negative rotation of the teeter axis, which is potentially independent from the described elastic bushings and/or the failsafe design.

Use of the present invention is by no means limited to aircraft but can be extended to all kinds of rotors (powered or not) that are subject to a teetering motion, e.g., in wind energy turbines, gyroplanes, etc.

BRIEF DESCRIPTION OF THE DRAWINGS

Additional features and advantages of the invention will become apparent from the following description of exemplary embodiments with reference to the attached drawings.

DETAILED DESCRIPTION

Figure 1:
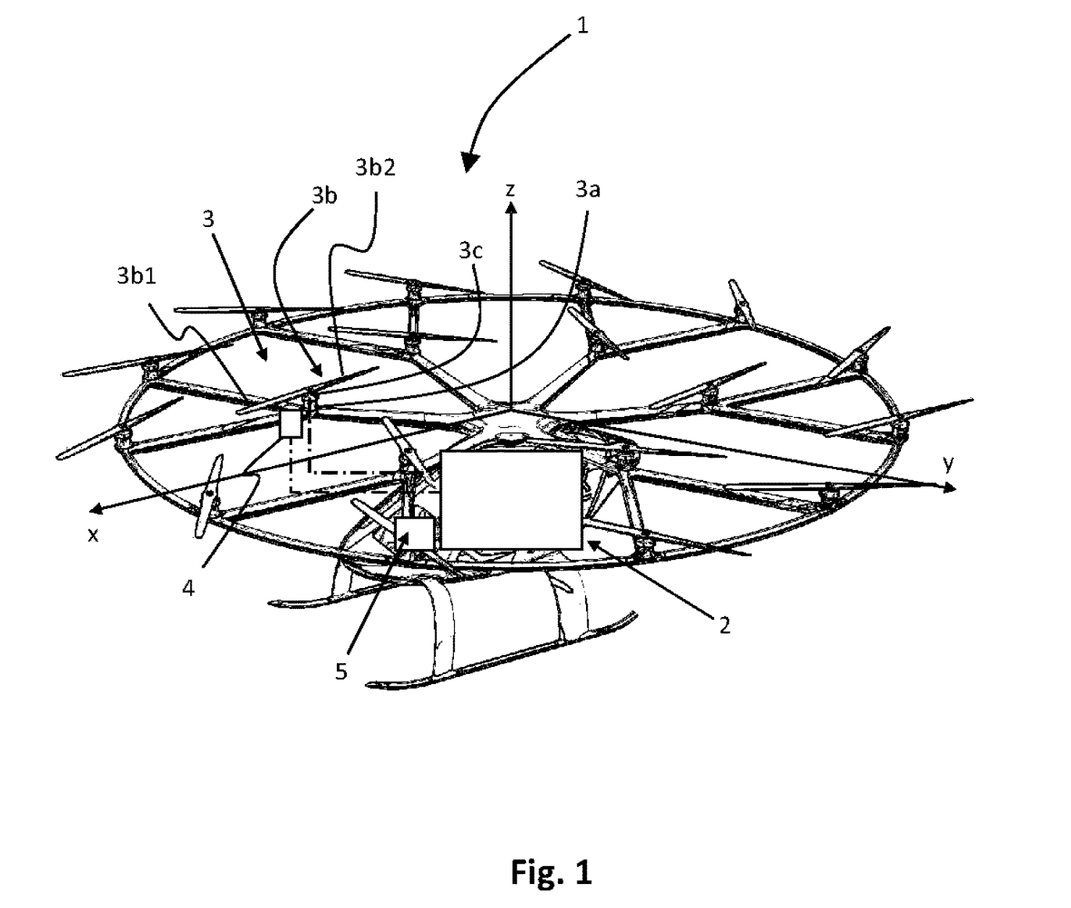
FIG. 1 shows an aircraft which can make use of the present invention.

FIG. 1 shows an aircraft 1 in the form of a multi-rotor VTOL aircraft as produced by the applicant. Aircraft 1 comprises an onboard flight controller 2 for controlling a plurality of, e.g., 18 electrically powered propulsion units 3, each propulsion unit at least comprising an electric motor 3*a* and a (preferably monolithic) rotor 3*b*, said rotor 3*b* having two rotor blades 3*b*1, 3*b*2 attached to a bearing 3*c*, as will be described with reference to FIGS. 2 through 8. In the following, element 3*c* will also be referred to as "hub". For reason of clarity, only one propulsion unit 3 and its components are explicitly denoted in FIG. 1. Reference numeral 4 denotes an exemplary sensor unit for measuring a current state of aircraft 1 and/or of propulsion unit 3. Reference numeral 5 denotes means for pilot input into flight controller 2 for steering the aircraft 1. Sensor unit 4 and propulsion units 3 are operatively connected in communication with flight controller 2, as depicted. Reference numerals x, y, and z denote the aircraft's main control axes, i.e., roll, pitch, and yaw.

Figure 2:
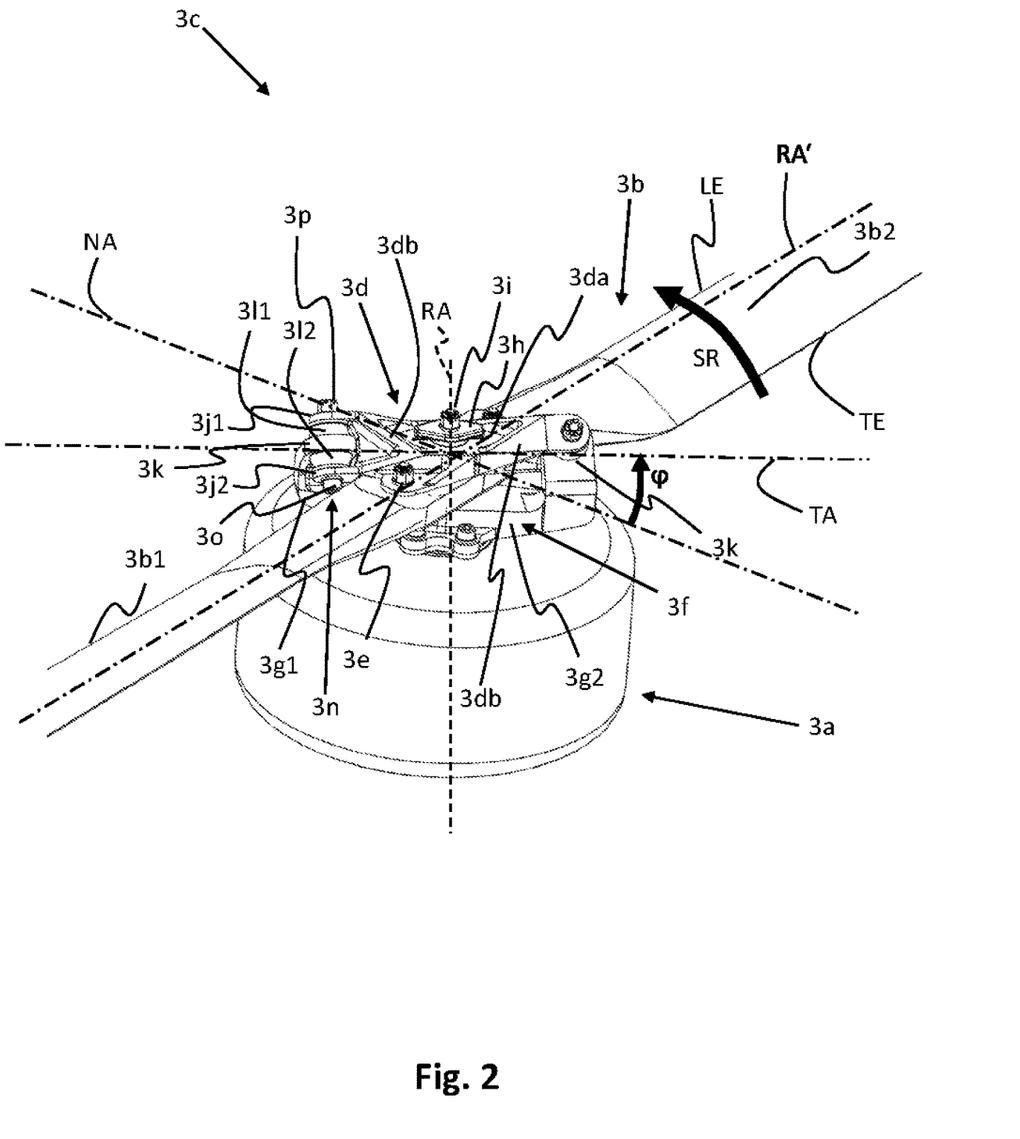
FIG. 2 shows a general perspective view of a driving arrangement comprising an elastic bearing or hub designed on the principles of the invention.

FIG. 2 shows a general view of a bearing 3*c* and a driving assembly designed on the principles of the invention. The rotor blades 3*b*1, 3*b*2 (which need not be separate elements but could form integral parts of a one-piece monolithic rotor) are attached to a teeter beam 3*d* by means of stud bolts 3*e* that are denoted only on one side of the arrangement. Reference numeral RA denotes the rotational axis of the assembly. The teeter beam 3*d* comprises a central portion or main body 3*da* arranged on said rotational axis, said central portion 3*da* having a least one fixing structure for attaching said rotor 3*b*, i.e., by means of said bolts 3*e*. The teeter beam 3*d* further comprises, departing from said central portion 3*da*, two arms 3*db* that extend outwardly in opposite radial directions with respect to said rotational axis RA. Below teeter beam 3*d* there is located a hub piece 3*f* that is devised for connection to a driving shaft of a (generic) motor 3*a*. Hub piece 3*f* has two arms 3*g*1, 3*g*2 (driving arms) that extend beyond said main body 3*da* of teeter beam 3*d* with respect to the rotational axis RA. Above teeter beam 3*d* there is located a retainer piece 3*h*. Hub piece 3*f* and retainer piece 3*h* are connected along the rotational axis RA by means of a central or failsafe pin 3*i*, as will become more apparent from FIG. 3. Teeter beam 3*d* is supported via respective pairs of (first) lugs 3*j*1, 3*j*2 at its two ends, i.e., on said arms 3*db*, between which are arranged respective (second) lugs 3*k* located at the ends of said arms 3*g*1, 3*g*2 of hub piece 3*f*. Sandwiched between lugs 3*j*1 and 3*k* viz. lugs 3*k* and 3*j*2 are elastomeric bushings 3/1, 3/2 such that an axis passing through a centre of each of the two lugs 3*k* forms a teeter pivot or teeter axis TA for the rotor blades 3*b*1, 3*b*2, and any angular deflection about this teeter axis TA compresses the bushing, e.g., bushing 3/1 on one side of the teeter axis and reduces compression on the bushing, e.g., bushing 3/2 on the other side of the teeter axis TA, and vice versa.

Here and in the following, elastomeric bushings are described as a nonlimiting example for elastic bushings.

If the teeter beam has single lugs at its respective ends, which is an alternative design (not shown), then the hub piece may have pairs of lugs at the respective ends of said arms, and the lugs of the teeter beam could be sandwiched between the respective pairs of lugs of the hub piece. Appropriate changes would then apply for the arrangement of the elastic (or elastomeric) bushings, as readily understood by those skilled in the art.

A spacing between inner faces of the lugs 3*j*1, 3*j*2, 3*k* is selected to provide a desired amount of pre-compression to the bushings 3/1, 3/2 to ensure that, in operation, and when deflected by teeter oscillation and loaded by torque and lift loads, that they remain in compression. They are fitted between the lugs 3*j*1, 3*j*2, 3*k* by being compressed into the available gap or spacing on assembly.

Between the two bushings 3/1, 3/2 at each end is positioned said single (second) lug 3*k* mounted directly on the hub piece 3*f*. This lug 3*k* provides a direct load path into the hub and is structurally more efficient and uses less material than an alternative configuration with the single lug at the ends of the teeter beam.

Figure 3:
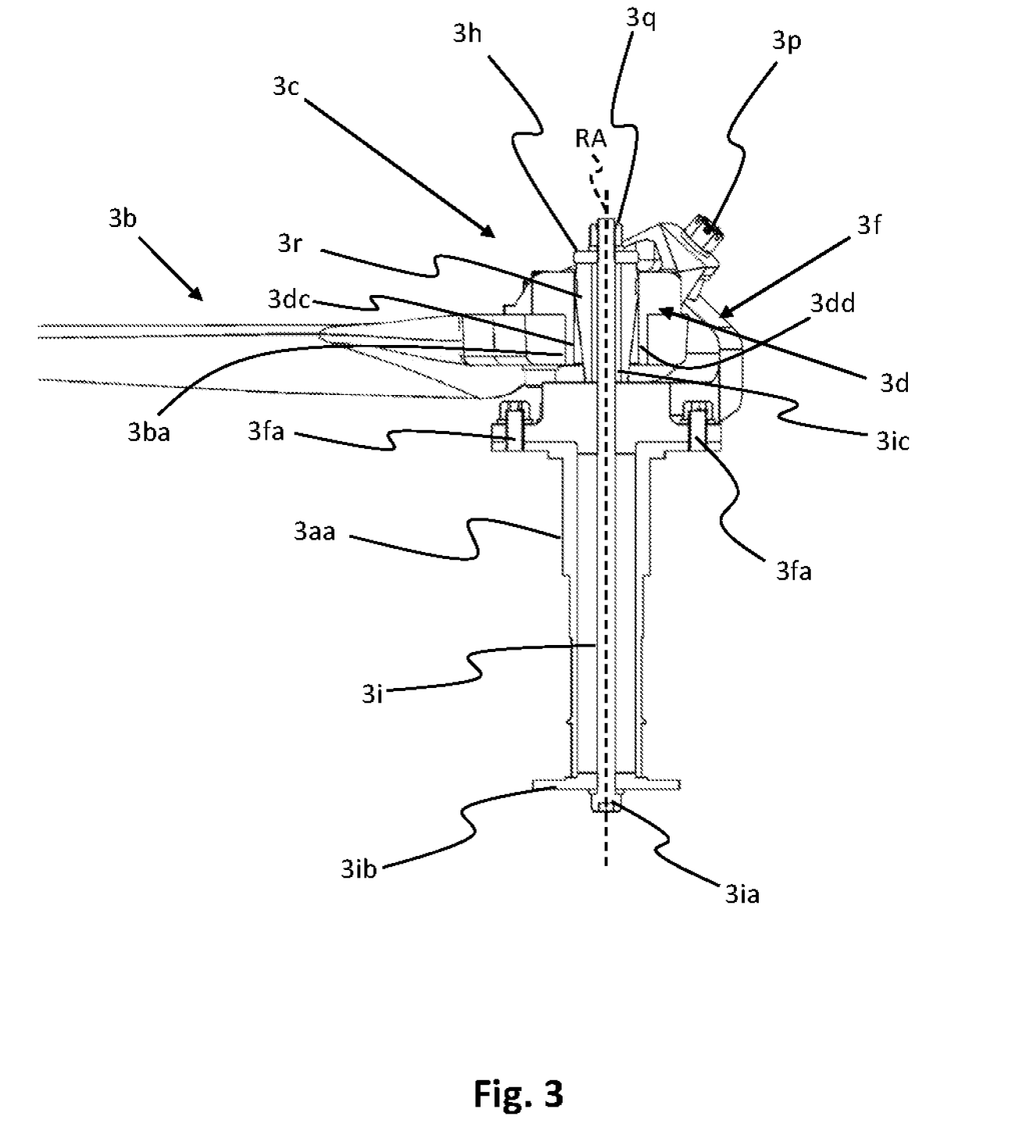
FIG. 3 shows a section through the centre of the bearing or hub of FIG. 2.
Figure 4:
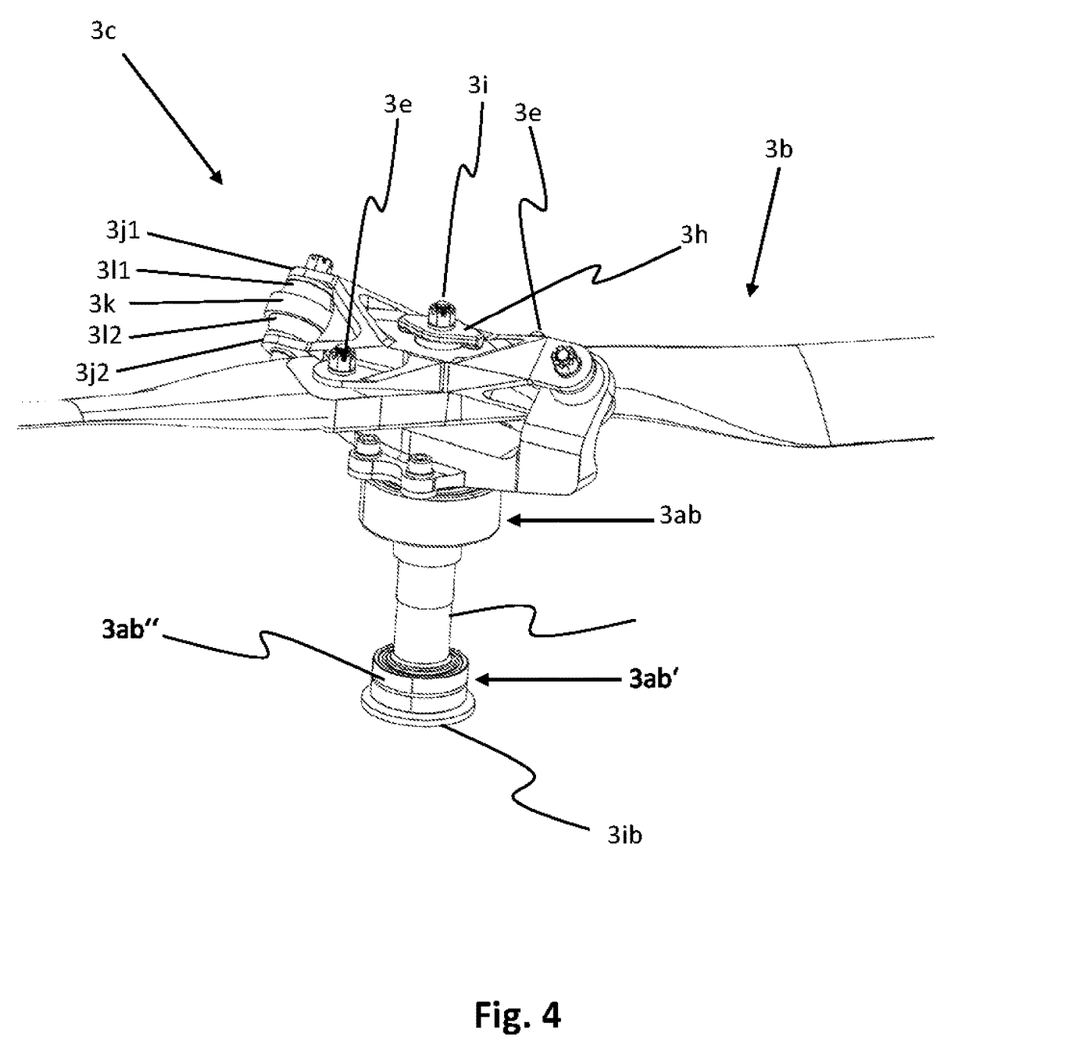
FIG. 4 shows a further perspective view of the bearing or hub of FIG. 2.
Figure 5:
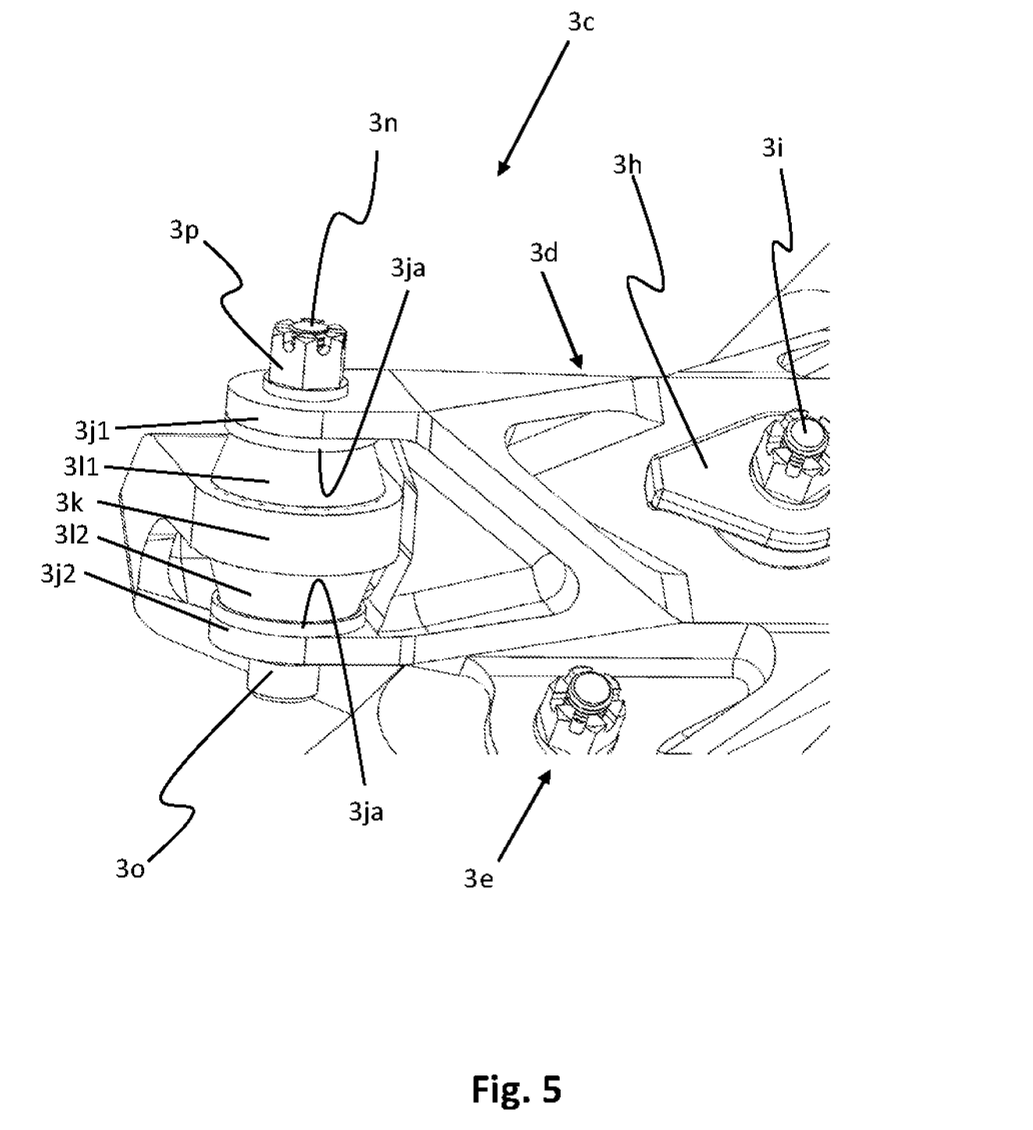
FIG. 5 shows a detail of the bearing of FIG. 2.

Second Lugs 3k are aligned with first lugs 3j1, 3j2 of teeter beam 3d for receiving connecting or teeter pins 3n, as will become more apparent from FIGS. 4 and 5. Lugs 3j1, 3j2 and 3k are angled with respect to the rotational axis RA, in particular by an angle of approximately 30° to 35° as will become particularly apparent from FIG. 3. As stated before, this angle only applies to a powered rotor, while an unpowered rotor, such as that on a gyroplane, would not benefit from this. For an unpowered rotor, the angle would preferably be 0°, and teeter beam 3d and hub piece 3f would be aligned. Connecting pins 3n comprises a screw head 3o on one end and threadedly engage a screw nut 3p at their other end.

The primary load path through the assembly is from the driven part of the hub or hub piece 3f via the two driving arms 3g1, 3g2 on this component, to said pair of connecting pins 3n passing through the axes of the elastomeric bushings 3l1, 3l2 and then to the pair of lugs 3j1, 3j2 which directly load the teeter beam 3d and hence the attached rotor blades 3b1, 3b2. Between the retainer piece 3h and the driven part of the hub (hub piece 3f) passes said failsafe pin 3i along the axis of rotation of the rotor (i.e., rotational axis RA) which provides a direct load path between the driven part of the hub (hub piece 3f) and the retainer piece 3h. Any failure of a component within the primary load path results in a resultant relative motion of the teeter beam 3d to the failsafe pin 3i, and so the failsafe pin 3i reacts any radial loading directly, while the retainer piece 3h reacts lift loads via the failsafe pin 3i. The failsafe pin 3i is thus trivially loaded in normal operation but is so configured to carry the full flight loads in the event of failure of any primary load path component.

The rotor 3b, i.e., the individual rotor blades 3b1, 3b2, has (each have) a leading edge LE and a trailing edge TE in relation to a sense of rotation SR of the rotor. Reference numeral RA' denotes the rotor axis, which must not be confounded with aforementioned rotational axis RA. At rights angles with respect to said rotor axis RA' lies so-called normal axis NA. With respect to said normal axis NA, teeter axis TA is rotated in negative direction by an angle φ, φ<0°, i.e., toward said trailing edge TE (negative skew angle). This is different than in known (active) teeter bearings, where φ>0°.

A range of skew angles were explored analytically and the results for a negative skew angle were surprising and of great interest. Accordingly, this configuration was designed as a physical specimen and tested. Wind tunnel experiments confirmed that a negative rotation of the teeter axis TA, i.e., with φ<0°, preferably −60°<φ<−30°, may generate a preferred lift vector in the case of a multirotor aircraft of the type shown in FIG. 1. Alternative embodiments of the present invention comprise a teeter axis TA that is rotated in positive direction, φ>0°, i.e., toward said leading edge LE, with respect to said neutral axis NA of the rotor.

The design shown in FIG. 2 achieves a lift vector with a reduced backward tilt in a direction opposite the direction of flight, while keeping the rotor stable aerodynamically, which may lead to a power reduction in forward flight.

Taking into account that in known use cases with fixed pitch rotors, the air stream comes either from a head-on direction along rotational axis RA (e.g., for propeller airplanes) or from the side (e.g., for helicopters, as shown in FIG. 2), the present description further comprises a novel design of an aerodynamically stable rotor with negative rotation of the teeter axis.

The design shown in FIG. 2 includes a failsafe function, as previously described, which is fulfilled by said retainer piece (or fail-safe retainer) 3h clamped in place by the failsafe pin 3i and positioned above teeter beam 3d. The fail-safe retainer 3h carries two buffer components (cf. FIG. 7) in close clearance with the top of the teeter beam 3d which provide a teeter pivot in the event of a primary load path failure.

Note that in FIG. 2 the hub 3c is shown mounted on a generic electric motor 3a although it can be mounted on a conventional rotorcraft gearbox or other source of power delivery to a motor shaft.

The hub 3c is shown with a monolithic two-blade rotor 3b. The use of such a rotor removes the need for the hub to carry blade root bending moments and so allows a lighter connecting structure to the teeter beam. Use of rotors with separate blades 3b1, 3b2 is equally possible, however.

FIG. 3 illustrates failsafe pin layout showing retention of the hub or bearing 3c in case of drive shaft or bearing failure. The failsafe pin 3i is extended through a hollow drive shaft 3aa of a motor (not shown) and is retained at its lower end by means of a screw head 3ia against a failsafe cap 3ib that closes a lower opening of the drive shaft 3aa. At the upper end, there is located a screw nut 3q engaging a threaded portion of the failsafe pin 3i. In the event of complete drive shaft failure or the failure of shaft bearings (not shown), or the failure of hub retaining fixings 3fa that connect shaft 3aa to hub piece 3f, the shaft 3aa is prevented from departure by the failsafe cap 3ib acting to prevent shaft pull-out. The upper end of the failsafe pin 3i (with screw nut 3q) clamps the failsafe retainer 3h against a cylindrical spacing sleeve 3ic that extends between hub piece 3f and failsafe retainer 3h and so reacts any lift loads from the rotor 3b directly to the failsafe cap 3ib via the failsafe pin 3i.

FIG. 3 further shows teeter stops that are arranged in the form of a teeter (stop) sleeve 3r (angled sleeve or shaped sleeve) of essentially conical shape acting on the internal surface of a bore 3dc through a centre of the teeter beam 3d. Teeter sleeve 3r, by way of its conical form, allows and limits a teetering motion of rotor 3b. The rotor 3b also has a central bore 3ba to allow the resulting hollow spigot 3dd in the teeter beam 3b to pass through. In the shown exemplary embodiment, an apex or tip of teeter sleeve 3r is in contact with hub piece 3f while a base of teeter sleeve 3r is in contact with failsafe retainer 3h.

FIG. 4 shows an overall view of hub or bearing 3c without motor casing. This overall view shows bearings 3ab, 3ab' for shaft 3aa. The failsafe cap 3ib is of greater diameter than the lower bearing 3ab' and, if required to perform a retaining function during a failure event, will be retained by contact with a lower bearing housing 3ab". To be effective, the failsafe cap 3ib therefore needs to be of greater diameter than the smallest fixed bore surrounding the shaft 3aa.

The monolithic rotor 3b is shown retained by two bolts 3e. In the event of a bolt failure the rotor 3b is still retained via the bore 3ba (FIG. 3) around the spigot 3dd (FIG. 3) on the teeter beam 3d. This bore 3ba surrounds the teeter stop sleeve 3r (FIG. 3) which is mounted on the failsafe pin 3i.

FIG. 5 shows a detail of the bushing assembly. The teeter or connecting pins 3n are devised as simple bolts passing through a pair of first lugs 3j1, 3j2 at each end of the teeter beam 3d. The hub piece 3f carries a single second lug 3k at each side, which second lug 3k is placed between said first lugs 3j1, 3j2 and the elastomeric bushings 3l1, 3l2 (cf. FIG. 2). Said elastomeric bushings 3l1, 3l2 are devised in the form of truncated cones, preferably with a respective base being in contact with said hub piece (second lug 3k). Around said first lugs 3j1, 3j2, i.e., around corresponding through-holes therein, there are protruding portions 3*ja* surrounding said lug through-holes for positioning of the bushings 3/1, 3/2.

The elastomeric bushings 3/1, 3/2 are pre-compressed by means of the connecting pins 3*n*, or the bushings can be pre-compressed by forcing them between two lugs that are a fixed, defined distance apart, i.e., outer (first) lugs 3*j*1, 3*j*2 on the one hand and inner (second) lug 3*k* on the other hand.

Figure 6:
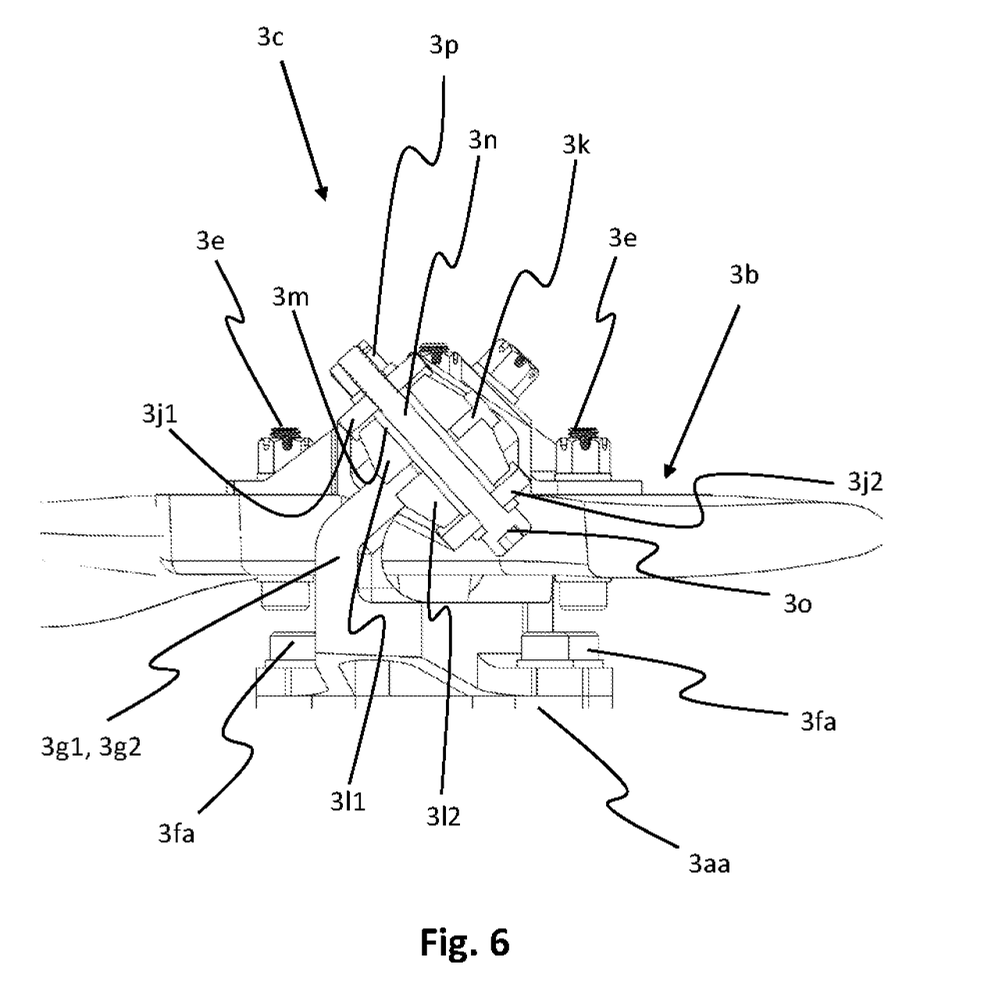
FIG. 6 shows a section through a connecting pin assembly comprised in the bearing or hub of FIG. 2.

As can be gathered from FIG. 6, which shows a section through the bushing assembly, a fitted tubular spacer 3*m* is passed through the two elastomeric bushings 3/1, 3/2 for each pair of said first lugs 3*j*1, 3*j*2 and bears on each of said two first lugs 3*j*1, 3*j*2 to react compression from the connecting pin 3*n*.

As can be further gathered from FIG. 6, second lug 3*k* comprise a recessed portion surrounding a lug through-hole for positioning of bushing 3/1, 3/2.

Teeter pin 3*n* is devised as a simple bolt passing through the teeter beam lugs (first lugs 3*j*1, 3*j*2) and the hub lug (second lug 3*k*).

As stated before, the bushings 3/1, 3/2 are compressed by forming the teeter beam lugs (first lugs 3*j*1, 3*j*2) and the hub lug (second lug 3*k*) with a correct spacing or gap to produce the desired pre-compression when the bushings 3/1, 3/2 are compressed and slid between the lugs 3*j*1, 3*j*2, 3*k* on installation.

To ensure that the teeter beam lugs (first lugs 3*j*1, 3*j*2) are not strained in an uncontrollable manner, said fitted tubular spacer 3*m* is arranged as previously described.

Figure 7:
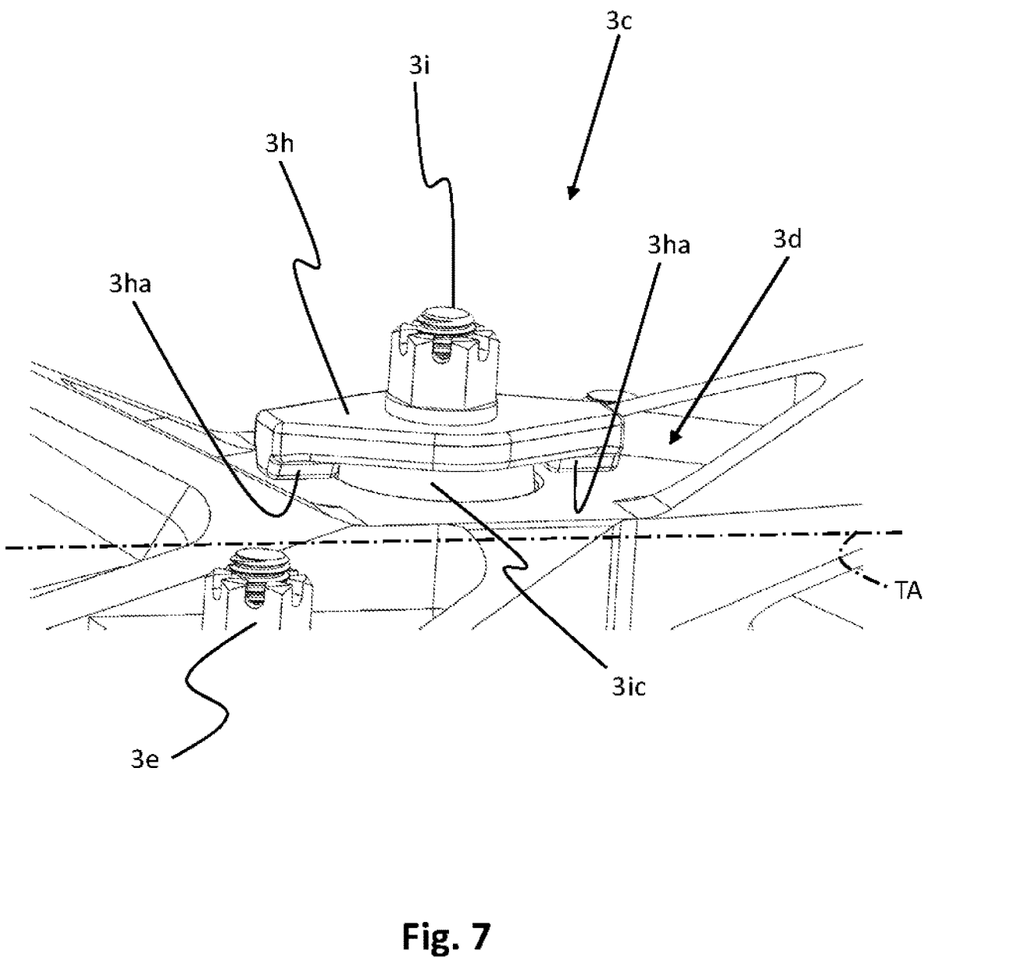
FIG. 7 shows a detail of the bearing of FIG. 2.

FIG. 7 provides details of the failsafe retainer 3*h* and corresponding buffers. As shown, the failsafe retainer 3*h* is clamped against the spacing sleeve 3*ic* (cf. FIG. 3) mentioned earlier. It performs a retaining function in a failsafe situation and carries on its underside a pair of buffer protrusions 3*ha* in close clearance with the top of the teeter beam 3*d*. These buffer protrusions 3*ha* provide vertical constraint in the event of any primary load path failure of the hub or shaft. They are aligned in azimuth with the teeter axis TA (cf. FIG. 2) to preserve the correct teeter axis TA after primary load path failure and so to ensure consistent rotor behaviour.

Figure 8:
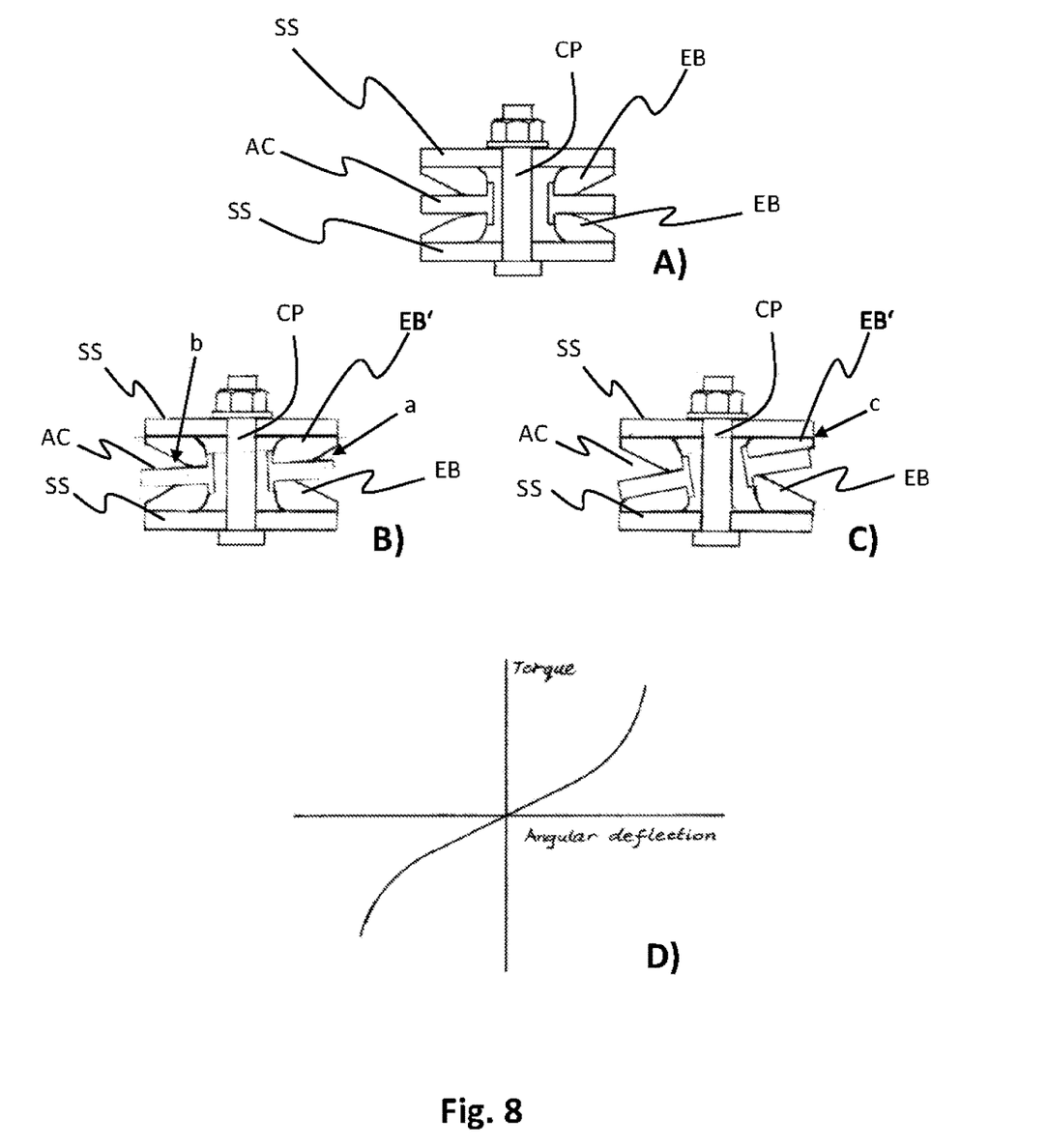
FIG. 8 shows the behaviour of an elastic bushing as used in the present invention.

FIG. 8 shows non-linear elastomeric bushings, which can be used in the present invention. Elastomeric bushings as so far described tend to naturally exhibit non-linear elastic behaviour. In an oscillatory situation this can be highly advantageous as a means to prevent uncontrolled resonance. Natural frequency of oscillation is a function of the mass restrained by an elastic element and the elastic stiffness of the constraint. A given mass and stiffness having a specific set of frequencies. Introducing non-linear stiffness, i.e., a non-linear force or moment-deflection characteristic results in each amplitude having a different natural frequency. The effect is to limit the amplitude of oscillation at a fixed frequency. This is referred to as "limit cycle oscillation", or LCO.

There is an advantage to designing a specific non-linearity in certain situations. In the case of the teetering rotor hub described, a very low stiffness is desirable for normal operation. For a teetering rotor there is also a maximum anticipated desirable oscillatory amplitude that is usually defined by the position of the rotor teeter stops. These are usually a hard limit arranged separately from the teeter bearings. With a non-linear characteristic within an elastomeric bearing, the non-linearity can be used to replace the separate rotor teeter stops by introducing features that cause the stiffness of the bearing to increase rapidly towards the limit of the rotational deflection. FIG. 8 shows a generalized elastomeric assembly configured to achieve this.

Referring to drawing "A", elastomeric bushings EB (such as bushings 3/1, 3/2 shown earlier) are placed between two supporting surfaces SS (such as first lugs 3*j*1, 3*j*2 shown earlier) that are part of or attached to the same component (e.g., said teeter beam 3*d*). Another component AC (such as second lug 3*k* shown earlier) is placed between the two bushings EB and is thus constrained by the bushings EB and can deflect in rotation about an axis normal to the axis of the bushings. The assembly is held together (pre-compressed) by means of connecting pin CP (such as pin 3*n* shown earlier).

Drawing "B" shows the assembly with a small rotational deflection of component AC. "a" indicates that the edge of the contact area of the upper bushing EB' has moved towards the edge of component AC on the side of the bushing EB' that has been further compressed by the deflection. The centre of pressure of the bushing EB' has thus also moved towards the edge of component AC on that side. Simultaneously, "b" indicates that the edge of the contact area of the upper bushing EB' on the side experiencing reduced compression due to the deflection has moved away from the edge of component AC, and with a corresponding shift of the centre of pressure on that side has also moved away from the edge of component AC. Similar behaviour can be observed on the lower bushing EB. The result is that the reacting moment on component AC increases in a non-linear manner with deflection.

Drawing "C" shows the same assembly with a much greater degree of deflection. "c" indicates the extreme edge of the upper bushing EB'. With this level of deflection component AC now makes contact at the extreme edge of the bushing EB' and so the maximum moment arm is achieved. In addition, the part of the bushing directly above the outside edge of component AC at "c" has a very short vertical extent between components SS and AC. This is directly equivalent to a very short spring element. For a given stiffness and cross-sectional area, any linear elastic material will produce a higher stiffness if the component it comprises is of smaller dimension in the direction of the applied load, this short vertical extent therefore results in a stiffness that increases rapidly as the bushing is further compressed between components SS and AC.

Drawing "D" shows a typical torque-deflection curve for a bushing as described in connection with drawings "A" through "C". "deflection" (horizontal axis) refers to rotational movement of component AC with respect to component SS. At low deflections, the curve is approximately linear with a point of inflexion at zero deflection. As deflection is increased in either a positive or negative direction, the curve becomes steeper. At maximum deflection, the curve becomes very steep, a vertical curve would indicate infinite stiffness and a very steep curve at this point fully replaces a separate teeter stop (cf. above) when applied to a rotor hub.

It must be noted that this is an example only and that the form of the bushings shown can be varied to produce any desired variation of stiffness with deflection. Component AC is depicted with a flat surface interaction with the bushings. This is not the only form possible and a non-planar surface, or a shaped feature of features on the interacting faces of component AC can be used to generate specific non-linear characteristics (cf. description above).

The assembly is also shown with component SS fixed and component AC moving. Another possible approach is with component AC fixed and component SS moving.

The invention claimed is:

1. An elastic teeter bearing (3c) for a rotor (3b) rotatably arranged on an rotational axis (RA) of said rotor (3b), the elastic teeter bearing comprising:
   a teeter beam (3d), configured for attachment of the a rotor (3b) thereto, the rotor having at least two rotor blades (3b1, 3b2), provided as separate blade parts or in one piece, said teeter beam (3d) being configured for performing a teetering motion with respect to said rotational axis (RA) and having at least two first lugs or two pairs of first lugs (3j1, 3j2) arranged at opposite ends thereof at a distance with respect to said rotational axis (RA);
   a hub piece (3f) located below said teeter beam (3d), said hub piece (3f) having at least two arms (3g1, 3g2) that extend outwardly in a radial direction with respect to said rotational axis (RA), each of said arms (3g1, 3g2) having a second lug (3k), in case said teeter beam (3d) has said two pairs of first lugs (3j1, 3j2), or having a pair of second lugs, in case said teeter beam (3d) has said two first lugs, arranged at said distance with respect to said rotational axis (RA);
   wherein each one of said second lugs (3k) is located between the two lugs of a respective said pair of first lugs (3j1, 3j2) or wherein each one of said first lugs is located between the two lugs of a respective said pair of second lugs, and respective connecting pins (3n) pass through said first and second lugs (3j1, 3j2, 3k) on either side of said rotational axis (RA); and
   a pair of elastic bushings (3l1, 3l2) arranged on each of said connecting pins (3n) between a first one of said first lugs (3j1) and said second lug (3k) and between a second one of said first lugs (3j2) and said second lug (3k), respectively, or vice versa.

2. The bearing (3c) of claim 1, wherein said hub piece (3f) is rotated relative to said teeter beam (3d) around said rotational axis (RA).

3. The bearing (3c) of claim 1, wherein said connecting pins (3n) are obliquely oriented with respect to said rotational axis (RA).

4. The bearing (3c) according to claim 1, wherein said first and second lugs (3j1, 3j2, 3k) are angled at 15° to 50° with respect to said rotational axis (RA), or wherein said first and second lugs (3j1, 3j2, 3k) are aligned with said rotational axis (RA) for an unpowered rotor (3b).

5. The bearing (3c) of claim 1, wherein said hub piece (3f) is aligned with teeter beam (3d) for an unpowered rotor (3b).

6. The bearing (3c) according to claim 1, wherein the connecting pins (3n) comprise means for compressing said bushings (3l1, 3l2), including a screw head (3o), a threaded end portion opposite said screw head, and a screw nut (3p) engaging said threaded end.

7. The bearing (3c) according to claim 1, wherein said teeter beam (3d) comprises a central portion (3da) arranged on said rotational axis (RA), said central portion (3da) having a least one fixing structure for attaching said rotor (3b), said teeter beam (3d) further comprising, departing from said central portion (3da), two arms (3db) that extend outwardly in opposite radial directions with respect to said rotational axis (RA), each of said arms (3db) comprising one of said pairs of first lugs (3j1, 3j2) arranged at said distance with respect to said rotational axis (RA).

8. The bearing (3c) according to claim 1, wherein the elastic bushings (3l1, 3l2) are formed as truncated cones, with a respective base being in contact with said hub piece (3f).

9. The bearing (3c) according to claim 1, wherein the elastic bushings (3l1, 3l2) are pre-compressed by the connecting pins (3n).

10. The bearing (3c) to claim 1, further comprising a fitted tubular spacer (3m) that passes through the two elastic bushings (3l1, 3l2) for each pair of said first lugs (3j1, 3j2) and bears on each of said two first lugs (3j1, 3j2).

11. The bearing (3c) to claim 1, wherein at least one of (a) said first lugs (3j1, 3j2) or (b) said second lugs (3k) comprise a recessed portion or a protruding portion (3ja) surrounding a lug through-hole.

12. The bearing (3c) according to claim 1, further comprising a central pin (3i) extending along said rotational axis (RA), through said hub piece (3f) and said teeter beam (3d), said central pin (3i) is configured to fix a relative position of said hub piece (3f) and said teeter beam (3d) on said rotational axis (RA).

13. The bearing (3c) according to claim 12, further comprising an angled sleeve (3r) around said central pin (3i) extending through an opening (3dc) in said teeter beam (3d).

14. The bearing (3c) according to claim 13, wherein said angled sleeve (3r) is formed as a truncated cone, a maximum diameter of which is in close clearance with an inner diameter of said opening (3dc), and said hub piece (3f) abuts on an end of said angled sleeve (3r).

15. The bearing (3c) according to claim 13, further comprising a spacing sleeve (3ic) around said central pin (3i) extending through said opening (3dc) in said teeter beam (3d) inside and through said angled sleeve (3r).

16. The bearing (3c) according to claim 12, further comprising a retainer piece (3h) arranged on said central pin (3i) at a first end thereof, said first end being located on a side of said teeter beam (3d) opposite from said hub piece (3f).

17. The bearing (3c) according to claim 1, wherein a teeter axis (TA) is rotated by an angle φ, φ>0°, or φ<0° with respect to a normal axis (NA) of the rotor (3b), said normal axis (NA) being oriented at right angles with respect to a rotor axis (RA').

18. A driving arrangement for driving a rotor (3b) in an aircraft (1), comprising:
   the bearing (3c) according to claim 12,
   a motor (3a) having a hollow drive shaft (3aa) that is connected to said hub piece (3f) for rotatably driving said hub piece, and said central pin (3i) extends coaxially through said drive shaft (3aa).

19. An aircraft (1), comprising:
   at least one propulsion unit (3) including a rotor (3b) comprising the bearing (3c) according to claim 1,
   wherein at least two rotor blades (3b1, 3b2) of said rotor (3b) are attached to the teeter beam (3d) of said bearing (3c) on opposing sides thereof, and
   said hub piece (3f) is connected to a drive shaft (3aa) of a motor (3a) of said at least one propulsion unit (3).

20. The aircraft of claim 19, wherein the aircraft is a multi-rotor VTOL aircraft (1) with a plurality of the propulsion units that are distributed, electrically powered propulsion units (3), and at least some of the distributed electrically powered propulsion units (3) each include one of the rotors (3b) having the bearing (3c).

* * * * *